Dec. 29, 1925.

A. JANUSZ

INKWELL

Filed July 27, 1922

1,567,597

INVENTOR.

Anthony Janusz.

BY George C. Heinicke,

ATTORNEY.

Patented Dec. 29, 1925.

1,567,597

UNITED STATES PATENT OFFICE.

ANTHONY JANUSZ, OF TURNERS FALLS, MASSACHUSETTS.

INKWELL.

Application filed July 27, 1922. Serial No. 577,928.

*To all whom it may concern:*

Be it known that I, ANTHONY JANUSZ, a citizen of Poland, residing at Turners Falls, county of Franklin, and State of Massachusetts, have invented certain new and useful Improvements in Inkwells, of which the following is a specification.

This invention relates to improvements in ink wells, and it is the principal object of my invention to provide an ink well provided with a firm support which will positively prevent a spilling of the ink if the well is accidentally overturned.

Another object of the invention is the provision of an ink well which allows a convenient filling and cleaning.

These and other objects of my invention will become more fully apparent as the description thereof proceeds, and will then be specifically pointed out in the appended claim.

In the accompanying drawing, forming a material part of this disclosure:—

Figure 1:
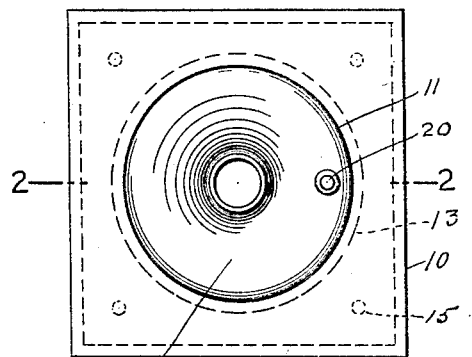
Figure 1 is a top plan view of an ink well, constructed according to the present invention.
Figure 2:
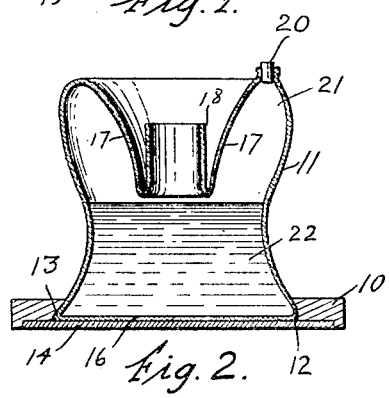
Figure 2 is a vertical section through the ink well on line 2—2 of Figure 1.

The ink well comprises a base plate 10 of any suitable material or shape provided with a central opening allowing the passage of the ink well proper 11 made of glass and having preferably the form illustrated in Figure 2.

The well 11 has an extending foot flange 12 gripping underneath the inner shoulder 13 of the base 10 and a bottom plate 14 is secured by any desired fastening means, indicated at 15 in a recess of base 10 and engages the bottom plate 16 of the well to firmly hold the same in place in the base plate.

The side walls of the well 11 are bent inwardly and downwardly as at 17, and then upwardly as at 18 to form a funnel 19 allowing a dipping of a pen into the ink contained in the well.

An opening is provided at a point of the upper edge of the funnel element 19 and is adapted to be closed by a removable cork 20.

It will be clear that after the foot flange 12 of the well 11 has been brought into engagement with the inner shoulder 13 of the base plate, and plate 16 has been fastened by means of screws or the like over the bottom of well 11 to the base plate 10, ink can be supplied to the well either through the funnel 18, 19 or through the opening closed by cork 20. If the ink well is handled carelessly it will in most instances rest firmly on its bottom or base plate 10, while when overturned accidentally, the ink will splash against the inner walls of the chamber 21 formed between the outer wall of the well 11 and the downwardly extending part 17, and no considerable amount of ink 22 will be spilled and make disagreeable blotches.

A cleaning of the ink well can readily be effected by introducing a stream of water through the upper opening after the removal of cork 20. However, the filling and cleaning operation may just as well also be effected through funnel 19.

Having thus described my invention, what I claim as new and desire to secure by Letters Patent is—

An ink well, comprising a structurally integral hollow body having a base wall and a side wall rising from the base wall at an upward inward inclination thereto, said wall above the lower portion curving inwardly and then outwardly, the upper end of said wall being rounded and extended as an inverted conical section within said wall, the bottom of the conical section terminating approximately in the transverse plane of the upper end of the inwardly curved portion of the side wall, and an entrance member of cylindrical form integral with the reduced end of the conical portion and extending upwardly within said conical portion and terminating on a plane materially below the upper end of the side wall.

In testimony whereof I have affixed my signature.

ANTHONY JANUSZ.